(12) United States Patent
Mathes et al.

(10) Patent No.: US 10,558,221 B2
(45) Date of Patent: Feb. 11, 2020

(54) METHOD FOR ASSISTING IN A PARKING OPERATION FOR A MOTOR VEHICLE, DRIVER ASSISTANCE SYSTEM AND A MOTOR VEHICLE

(75) Inventors: Joachim Mathes, Heilbronn (DE); Patrice Reilhac, Esslingen (DE)

(73) Assignee: Valeo Schalter und Sensoren GmbH, Bietigheim-Bissing (DE)

(*) Notice: Subject to any disclaimer, the term of this patent is extended or adjusted under 35 U.S.C. 154(b) by 255 days.

(21) Appl. No.: 13/814,952

(22) PCT Filed: Aug. 1, 2011

(86) PCT No.: PCT/EP2011/063182
§ 371 (c)(1),
(2), (4) Date: Mar. 20, 2013

(87) PCT Pub. No.: WO2012/019932
PCT Pub. Date: Feb. 16, 2012

(65) Prior Publication Data
US 2013/0169792 A1    Jul. 4, 2013

(30) Foreign Application Priority Data
Aug. 12, 2010   (DE) .................. 10 2010 034 139

(51) Int. Cl.
*B60W 30/095* (2012.01)
*G05D 1/02* (2020.01)
(Continued)

(52) U.S. Cl.
CPC ......... *G05D 1/0246* (2013.01); *B62D 15/027* (2013.01); *B62D 15/028* (2013.01);
(Continued)

(58) Field of Classification Search
CPC ... H04N 7/18; B60R 1/025; G05D 2201/0213
See application file for complete search history.

(56) References Cited

U.S. PATENT DOCUMENTS 7,139,412 B2 * 11/2006 Kato .................. B60R 1/00
340/426.23
7,272,477 B2 * 9/2007 Oki ..................... B62D 15/028
180/199
(Continued)

FOREIGN PATENT DOCUMENTS

CN      1975331 A      6/2007
DE   102005034900 A1   3/2006
(Continued)

OTHER PUBLICATIONS

Partial human translation of JP2003-267171A, [0053]-[0055].*
(Continued)

*Primary Examiner* — Brian T Pendleton
*Assistant Examiner* — Kyle M Lotfi
(74) *Attorney, Agent, or Firm* — Osha Liang LLP (57) ABSTRACT

The invention provides a method for assisting in a parking operation for a motor vehicle (1) using a driver assistance system (2). The driver assistance system (2) determines a parking path along which the motor vehicle (1) can be parked into a parking space (21) or driven out of the parking space (21). Image data about surroundings (10 to 13) of the motor vehicle (1) are captured by at least one optical capture device (5a to 5d) of the driver assistance system (2). The image data are processed to produce an image (19) which shows a perspective view of at least one surrounding area (20) next to the motor vehicle (1). The image (19) is displayed on a display device (3). The image (19) is produced by taking account of a current position of the motor vehicle (1) on the calculated parking path. By way of example, a direction of view (14) and/or a field of view (15) from which the perspective view is shown can be set on the basis of the current position of the motor vehicle (1) on the (Continued)

parking path. The invention also provides a driver assistance system (2) and a motor vehicle (1).

20 Claims, 4 Drawing Sheets (51) Int. Cl.
*B62D 15/02* (2006.01)
*G06K 9/00* (2006.01)
*G06T 15/20* (2011.01)
*G08G 1/16* (2006.01)

(52) U.S. Cl.
CPC ..... *B62D 15/0275* (2013.01); *G06K 9/00812* (2013.01); *G06T 15/20* (2013.01); *G08G 1/168* (2013.01)

(56) References Cited

U.S. PATENT DOCUMENTS

| | | | | |
|---|---|---|---|---|
| 7,277,123 | B1* | 10/2007 | Okamoto et al. | 348/148 |
| 2003/0085999 | A1* | 5/2003 | Okamoto | B60R 1/00 348/148 |
| 2004/0153243 | A1* | 8/2004 | Shimazaki | B62D 15/0275 701/300 |
| 2005/0055139 | A1* | 3/2005 | Tanaka | |
| 2006/0192660 | A1* | 8/2006 | Watanabe | B60R 1/00 340/435 |
| 2007/0088474 | A1* | 4/2007 | Sugiura | B60R 1/00 701/36 |
| 2007/0146165 | A1* | 6/2007 | Tanaka | B62D 15/0285 340/932.2 |
| 2007/0279493 | A1* | 12/2007 | Edanami | B62D 15/0275 348/148 |
| 2007/0299584 | A1 | 12/2007 | Okamoto et al. | |
| 2008/0007618 | A1 | 1/2008 | Yuasa | |
| 2008/0043113 | A1* | 2/2008 | Ishii | G06T 3/4038 348/218.1 |
| 2008/0266139 | A1* | 10/2008 | Kim | B62D 15/027 340/932.2 |
| 2009/0079828 | A1 | 3/2009 | Lee et al. | |
| 2010/0001881 | A1* | 1/2010 | Sugie | B60R 1/00 340/932.2 |
| 2010/0182432 | A1* | 7/2010 | Augst | B60R 1/00 348/148 |

FOREIGN PATENT DOCUMENTS

| | | | |
|---|---|---|---|
| DE | 10 2006 055 372 A1 | 6/2007 | |
| DE | 102006031895 A1 | 1/2008 | |
| DE | 102008046544 A1 | 5/2009 | |
| DE | 102009005505 A1 | 10/2009 | |
| EP | 1 179 958 A1 | 2/2002 | |
| JP | 2002-087190 A | 3/2002 | |
| JP | 2003-267171 A | 9/2003 | |
| JP | 2008-296697 A | 12/2008 | |
| JP | 2010-047105 A | 3/2010 | |
| WO | 2008/055567 A1 | 5/2008 | |
| WO | WO-2009081519 A1 * | 7/2009 | ......... B62D 15/0275 |
| WO | 2009/139281 A1 | 11/2009 | |

OTHER PUBLICATIONS

International Search Report from PCT/EP2011/063182 dated Oct. 13, 2011 (6 pages).
Search Report issued in corresponding German Patent Application No. 10 2010 034 139.8, dated Jul. 13, 2011 (8 pages).
Notice of Reasons for Rejection issued in corresponding Japanese Patent Application No. 2013-523561, dated Dec. 16, 2014 (13 pages).
The First Office Action issued in corresponding Chinese Patent Application No. 201180044159.8, dated Dec. 17, 2014 (19 pages).

* cited by examiner

METHOD FOR ASSISTING IN A PARKING OPERATION FOR A MOTOR VEHICLE, DRIVER ASSISTANCE SYSTEM AND A MOTOR VEHICLE

The invention relates to a method for assisting in a parking operation for a motor vehicle using a driver assistance system. The assistance is provided by determining a parking path along which the motor vehicle is parked into a parking space (without collision) or is driven out of said parking space, and also by capturing image data about surroundings of the motor vehicle by means of at least one optical capture device of the driver assistance system. The image data are processed to produce an image which shows a perspective view of at least one surrounding area next to the motor vehicle. The image is displayed on a display device. The invention also relates to a driver assistance system for carrying out such a method, and to a motor vehicle having such a driver assistance system.

Parking assistance systems or driver assistance devices which assist the driver in carrying out parking operations are already known from the prior art. This assistance at least involves a current relative position of the motor vehicle in relation to a recognized potential parking space being taken as a basis for the driver assistance system to calculate a parking path along which the motor vehicle can parked into the parking space without collision. In the simplest parking assistance systems, information or advice is then output regarding how the driver needs to steer in order for the motor vehicle to be able to be parked along the calculated parking path. Systems are also known in which the driver is told to accelerate and brake while the steerable wheels of the motor vehicle are steered and hence turned automatically and hence independently of the driver. In the case of totally autonomous or automatic parking assistance systems, the system also takes action in the drive train of the vehicle; the driver merely needs to enable the autonomous parking operation and can also interrupt the parking operation at any time.

A parking assistance system is known from the document WO 2008/055567 A1, for example.

It is furthermore prior art to display images of surroundings of the motor vehicle on a display device in the interior of the motor vehicle. The latest trend is to process the image data from a multiplicity of cameras together to produce such an image as shows a plan view of the motor vehicle and also the surroundings around the motor vehicle. In this case, the map of the motor vehicle is stored in advance, while the map of the surroundings is progressively produced from the continuously captured image data afresh each time on a dynamic basis. The motor vehicle and the surroundings thereof are shown from a bird's eye perspective in such an image. Such an approach is evident in disclosed form from the document EP 1 179 958 A1, for example. In the subject matter based on this document, it is also possible for a direction of view from which the motor vehicle and the surroundings are shown to be altered on the basis of the respective instantaneous travel state of the motor vehicle. By way of example, the direction of view can be set on the basis of the vehicle speed or else on the basis of a current steering angle.

It is an object of the invention to demonstrate a solution to how, in the case of a method of the type in question cited at the outset, the driver can be assisted in carrying out a parking operation by the driver assistance system in particularly reliable and user-friendly fashion.

The invention achieves this object by means of a method having the features according to patent claim 1, and also by a driver assistance system having the features according to patent claim 13 and by a motor vehicle having the features of patent claim 14. Advantageous embodiments of the invention are the subject matter of the dependent patent claims and the description.

A method according to the invention for assisting in a parking operation for a motor vehicle involves a driver assistance system determining a parking path along which the motor vehicle can be parked into a parking space without collision or can be driven out of this parking space. Image data about surroundings of the motor vehicle are captured by at least one optical capture device—for example a camera—of the driver assistance system. The image data are processed by the driver assistance system to produce an image which shows a perspective view—particularly a plan view from above the motor vehicle—of at least one surrounding area next to the motor vehicle. The image is displayed on a display device of the driver assistance system. An essential concept for the invention is that the image is produced by taking account of a current position of the motor vehicle on the parking path.

The effect according to the invention is thus achieved by taking account of the respective instantaneous position of the motor vehicle on the calculated parking path when producing the image from the image data, or producing the image on the basis of the respective current relative position of the motor vehicle in relation to the parking space. In this way, the driver can be assisted in carrying out parking operations in a particularly reliable and user-friendly manner. The reason is that the image can show respective different areas next to the motor vehicle on the basis of the position of the motor vehicle, with the result that the driver has different images of the surroundings displayed to him, namely depending on the current position on the parking path. It is therefore possible to display the respective relevant area next to the motor vehicle from the respective best perspective.

Generally, at least one parameter or at least one property of the image can be set by taking account of the respective current position of the motor vehicle relative to the parking space. By way of example, this may be a direction of view and/or a field of view from which the perspective view is shown. In this embodiment, the direction of view and/or the field of view is/are thus set on the basis of the current position of the motor vehicle on the parking path. This has the advantage that, depending on the position of the motor vehicle, it is possible to set the respective optimum perspective. The driver thus has an image displayed to him which shows the surrounding area and particularly also the motor vehicle itself from such a direction of view or from such a field of view as caters for optimum vision or for optimum presentation. By way of example, at the beginning of a parking operation—when the motor vehicle is in an initial area of the parking path—the direction of view may point in the direction of the parking space, with the result that the parking space is presented from a field of view above the motor vehicle. At the end of the parking operation, by contrast, the motor vehicle and its surroundings can be shown from such a direction of view as coincides with the vehicle vertical axis. This allows the driver to infer the distances between the motor vehicle and the objects that are external to the vehicle and that bound the parking space without a large amount of effort.

In this context, a "direction of view" is understood to mean that direction from which a virtual observer looks when looking at the image.

In addition or as an alternative, it is also possible for a size of the mapped surrounding area to be set on the basis of the current position of the motor vehicle on the parking path. In this embodiment, in other words a zoom factor for the map of the surrounding area is set. By way of example, this may take the appearance that at the beginning of the parking operation the image shows the surrounding area up to a greater range from the motor vehicle than at the end of the parking operation. In that case, at the beginning of the parking operation, the driver may also see such obstacles as are at a relatively greater distance from the motor vehicle, namely in the parking space, for example, with the result that the parking operation can also be interrupted if necessary. On the other hand, at the end of the parking operation, the driver is able to ascertain the distances between the motor vehicle and the obstacles bounding the parking space with a high level of accuracy. Such an approach thus caters firstly for a safe parking operation and secondly also for a user-friendly display.

Preferably, the image data are processed such that the image shows a plan view of at least the surrounding area next to the motor vehicle from above the motor vehicle. In other words, in this embodiment the image shows the surrounding area and possibly also at least an area of the motor vehicle from a bird's eye perspective. Precisely this provides the driver with the option of monitoring the surrounding area and possibly also inferring the distances between the motor vehicle and objects that are external to the vehicle with the least effort.

In one embodiment, for at least one section of the parking path the image also shows at least one area of the motor vehicle in addition to the surrounding area. In particular, the image shows a plan view of the whole motor vehicle and also the surrounding area around the motor vehicle for at least one section of the parking path. In that case, the driver can look at not only the surroundings but also his own motor vehicle in the image that is displayed; he is able to infer the respective instantaneous relative position of an obstacle in relation to the motor vehicle.

The map of the motor vehicle is presented on the display device preferably at a fixed location or statically in the displayed image, while the map of the surrounding area is produced from the image data afresh each time or is progressively adjusted. The map of the motor vehicle is preferably stored in advance, namely in a memory of the driver assistance system. As a result of the motor vehicle being presented at a fixed location, it is possible to present the same respective surrounding area next to the motor vehicle, or the surrounding area can always be presented up to the same range from the motor vehicle.

A parking space is usually surveyed or captured while the motor vehicle is passing the parking space. Precisely then, it is found to be particularly advantageous if the driver is able to see the parking space on the display device. During the operation of capturing the parking space—that is to say particularly while the motor vehicle is passing the parking space—it is therefore possible for the perspective view to be shown from such a direction of view as prompts the parking space to be shown in the image in a perspective presentation. If the parking space is still in front of the motor vehicle, the direction of view may thus have a direction component for the direction of travel of the motor vehicle and also a direction component for a transverse half-axis of the motor vehicle, namely particularly the right-hand transverse half-axis for right-hand traffic and the left-hand transverse half-axis for left-hand traffic. If, by contrast, the parking space—seen in the direction of travel—is already behind the motor vehicle, the direction of view may have a direction component contrary to the direction of travel and also a direction component for the cited transverse half-axis. The reason is that in that case there is the assurance that the parking space is always mapped in the displayed image and the driver sees a perspective view of the parking space on the display device.

If the motor vehicle is in an initial area of the carriageway, the perspective view can be shown from such a direction of view as points in the direction of an end of the parking path or in the direction of the parking space. In that case too, the driver can look at a perspective view of the parking space on the display device.

If, during the operation of parking, a remaining distance for the parking path is below a prescribed minimum or if the motor vehicle reaches a prescribed end area of the parking path, it is possible for the perspective view to be shown from such a direction of view as coincides with the vehicle vertical axis. In that case, the driver sees a plan view of the surrounding area and particularly also of the whole motor vehicle from a right angle on the display device; the driver can therefore manoeuvre the motor vehicle particularly safely, since he is able to ascertain a distance between the motor vehicle and an obstacle particularly easily.

While the motor vehicle is being moved along the parking path, the direction of view and/or the field of view can also be altered progressively—i.e. continuously over time—at least for a section of the parking path. This alteration in the direction of view and/or in the field of view is also made preferably steadily, i.e. such that the driver does not perceive an abrupt alteration in the direction of view. Such alteration of the direction of view or of the field of view is particularly user friendly and furthermore ensures that the driver is always able to retain his orientation in the displayed image. By way of example, the progressive alteration of the direction of view and/or of the field of view can take place on the basis of a current speed of the motor vehicle and/or on the basis of a remaining distance for the parking path, i.e. a distance which still remains up to the final position in the parking space. In particular, the speed of the progressive alteration of the direction of view and/or of the field of view can be set on the basis of the speed of the motor vehicle and/or on the basis of the remaining distance.

Using the image data and/or using data from a distance sensor—particularly an ultrasound sensor—it is also possible for the driver assistance system to detect at least one object that is external to the vehicle. In that case, this object can have a predetermined symbol superimposed on it, or be concealed by this symbol, at least in areas in the displayed image. Hence, objects in the surroundings of the motor vehicle can be highlighted, with the result that the driver is able to recognize them significantly earlier.

The image data are captured by at least one optical capture device. It is found to be particularly advantageous if the image data are captured by at least two, particularly by at least three, optical capture devices. It is also possible for a total of four optical capture devices to be provided. It is thus possible for a plurality of capture devices to be used in total, namely one capture device on a left-hand flank and/or one capture device on a left-hand exterior mirror and/or one capture device on a right-hand flank and/or one capture device on a right-hand exterior mirror and/or one capture device on a front bumper and/or one on a rear bumper of the motor vehicle or else on a tailgate. Overall, the capture devices are able to capture a 360° image of the surroundings around the motor vehicle. The at least one capture device may be a camera, for example, namely particularly a CMOS (Complementary Metal Oxide Semiconductor) camera or a CCD (Charge-Coupled Device) camera.

Preferably, the at least one optical capture device has a capture angle from a range of values from 170° to 195°. Thus, the at least one capture device is preferably a fish-eye camera. In this way, it is possible to use just three or four capture devices to capture the entire surroundings around the motor vehicle. The driver assistance system thus requires only a relatively small number of capture devices.

Furthermore, the invention provides a driver assistance system for a motor vehicle, namely for assisting in a parking operation. The driver assistance system comprises at least one optical capture device for capturing image data about surroundings of the motor vehicle. It also comprises a control device for determining a parking path for the parking operation and for processing the image data to produce an image which shows a perspective view of at least one surrounding area next to the motor vehicle. The image is displayed on a display device of the driver assistance system. The control device is designed to produce the image by taking account of a current position of the motor vehicle on the parking path.

A motor vehicle according to the invention comprises a driver assistance system according to the invention. The preferred embodiments presented with reference to the method according to the invention, and the advantages of said embodiments, apply accordingly to the driver assistance system according to the invention and the motor vehicle according to the invention.

Further features of the invention arise from the claims, the figures and the description of the figures. All of the features and combinations of features that are cited in the description above and also the features and combinations of features which are cited in the description of the figures and/or are shown in the figures alone can be used not only in the respectively indicated combination but also in other combinations or also on their own.

The invention will now be explained in more detail using single preferred exemplary embodiments, and also with reference to the appended drawings, in which.

Figure 1:
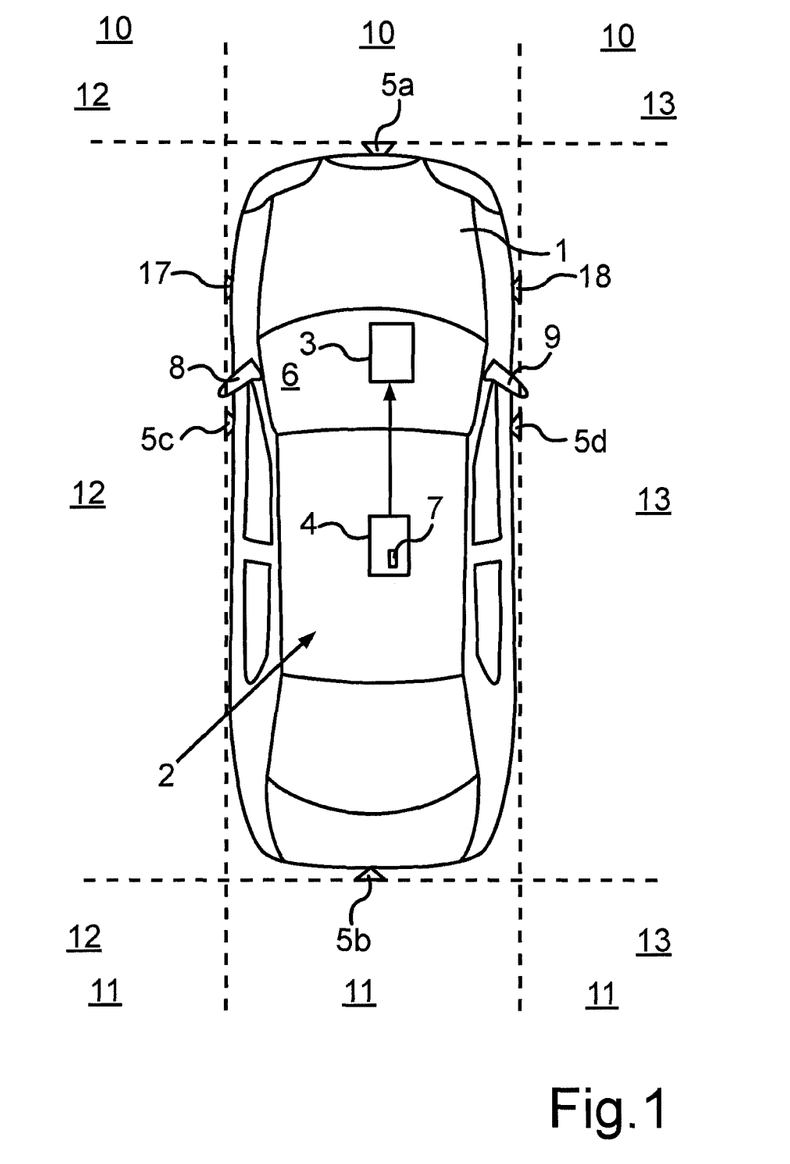
FIG. 1 shows a schematic illustration of a plan view of a motor vehicle with a driver assistance system based on an embodiment of the invention.

A motor vehicle 1, as is shown in FIG. 1, is a car. The motor vehicle 1 comprises a driver assistance system 2 which comprises the following components: a display device 3, a control device 4, and also four cameras 5a to 5d. The control device 4 actuates the display device 3. The cameras 5a to 5d transmit captured image data to the control device 4, namely via an internal communication bus of the motor vehicle 1, for example.

By way of example, the display device 3 may be an LCD display. Alternatively, it may be an image projector which can be used to project images onto a windscreen 6 of the motor vehicle 1 (a Head-up-Display).

The control device 4, namely a memory 7, stores a map of the motor vehicle 1, and to be more precise data which represent a map of the motor vehicle 1.

The cameras 5a to 5d are mounted on an exterior surface of the motor vehicle 1. The number and arrangement of the cameras 5a to 5d is shown in FIG. 1 merely by way of example; depending on the embodiment, the number of cameras 5a to 5d and the arrangement thereof on the motor vehicle 1 may vary. In the exemplary embodiment, a first camera 5a is arranged on a front bumper of the motor vehicle 1, while a second camera 5b is arranged on a rear bumper or else on a tailgate. A third camera 5c is mounted on the left-hand flank; it may also be integrated in a left-hand exterior mirror 8. A fourth camera 5d is mounted on the right-hand flank, namely in the area of a right-hand exterior mirror 9. The fourth camera 5d may also be integrated in the exterior mirror 9.

The cameras 5a to 5d each have a wide capture angle and are therefore what are known as fish-eye cameras. By way of example, the respective capture angle may be in a range of values from 170° to 195°. As is evident from FIG. 1, the first camera 5a captures an area 10 in front of the motor vehicle 1, while the second camera 5b captures an area 11 behind the motor vehicle 1. Accordingly, the third camera 5c captures an area 12 to the left of the motor vehicle 1; the fourth camera 5d captures an area 13 to the right of the motor vehicle 1. The cameras 5a to 5d are thus able to capture essentially all of the surroundings around the motor vehicle 1, namely a 360° image.

The control device 4 is able to process the image data captured by the cameras 5a to 5d. The control device 4 can use the image data to produce an image which shows a plan view of the surroundings of the motor vehicle 1, namely of the capture areas 10 to 13, from above the motor vehicle 1. The control device 4 can thus take the image data and produce an image which shows a plan view of the capture areas 10 to 13 from a bird's eye perspective.

As already explained, the memory 7 stores a map of the motor vehicle 1. This map also shows the motor vehicle 1 from a bird's eye perspective; in other words, this map shows a plan view of the motor vehicle 1 from above the latter. The control device 4 can take the map of the motor vehicle 1 and the map of the surroundings which is produced using the image data and produce an image of the surroundings which shows a plan view both of the motor vehicle 1 and of the surroundings around the motor vehicle 1, namely from a bird's eye perspective. A single image of the surroundings is therefore used to present both the surroundings of the motor vehicle 1 and the motor vehicle 1 itself from a bird's eye perspective. This image of the surroundings can be displayed by the control device 4 on the display device 3. This image of the surroundings can be displayed continuously; this means that the image of the surroundings can be adjusted progressively or dynamically to the surroundings of the vehicle 1. The reason is that the image data are captured progressively by the cameras 5a to 5d, and the image of the surroundings is produced afresh each time on a dynamic basis from the progressively captured image data. In the image of the surroundings, the motor vehicle 1 can be shown at a fixed location or statically, while the map of the surroundings can be constantly updated and dynamically adjusted.

Figure 2:
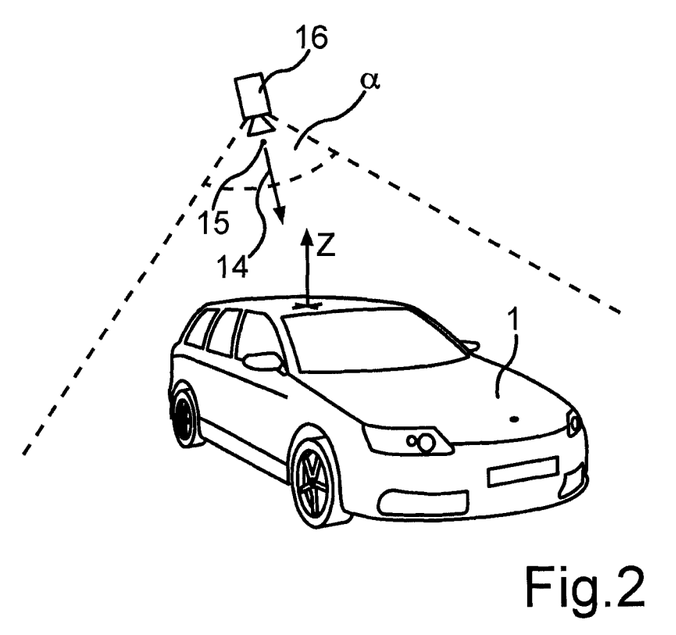
FIG. 2 shows a schematic and perspective illustration of the motor vehicle shown in FIG. 1, with the production of an image from image data being explained in more detail.

Thus, the control device 4 can produce an image of the surroundings which shows a plan view of a surrounding area next to the motor vehicle and also of the motor vehicle in a perspective presentation from above the motor vehicle 1. Such an image presents the motor vehicle 1 and also the surrounding area, that is to say from a bird's eye perspective. As FIG. 2 shows, the control device 4 can produce such an image as presents the plan view from a direction of view 14 and from a field of view 15 for a virtual camera 16. Thus, such an image as would be produced using such a camera 16 is produced. The camera 16 presented in FIG. 2 is a fictitious or virtual camera which in fact does not exist. Only the image data from the cameras 5a to 5d are processed such that an image produced therefrom shows the plan view from the direction of view 14 and the field of view 15 of the virtual camera 16.

The exemplary embodiment particularly involves assisting the driver in parking the motor vehicle 1 in a parking space. For this purpose, the driver assistance system 2 contains two distance sensors 17, 18, namely particularly ultrasound sensors. The first distance sensor 17 is mounted on the left-hand flank—for example in the left-hand edge area of the front bumper—while the second distance sensor 18 is arranged symmetrically on the opposite side of the motor vehicle 1. The support for a parking operation at least comprises the driver assistance system 2 first of all capturing a parking space and then taking the current position of the motor vehicle 1 relative to the parking space as a basis for calculating a parking path along which the motor vehicle 1 can be parked in the parking space without collision. Usually, the parking space is captured or surveyed while the motor vehicle 1 is passing the parking space. When a suitable parking space is recognized, the driver is informed and is able to initiate the parking operation. The driver assistance system 2 can assist the driver both when parking in a perpendicular parking space and when parking in a parallel parking space.

During the survey on the parking space and during the parking operation, the display device 3 is used to display the image which is produced from the progressively captured image data afresh each time on a continuous basis. This involves the image being produced by taking account of the respective instantaneous relative position of the motor vehicle in relation to the parking space or by taking account of the current position of the motor vehicle 1 on the calculated parking path. Specifically, in the exemplary embodiment, the direction of view 14, the field of view 15, and the size of the mapped surrounding area—that is to say a virtual capture angle α for the virtual camera 16—are set on the basis of the respective instantaneous position of the motor vehicle 1 relative to the parking space or the current position of the motor vehicle 1 on the calculated parking path.

Figure 3:
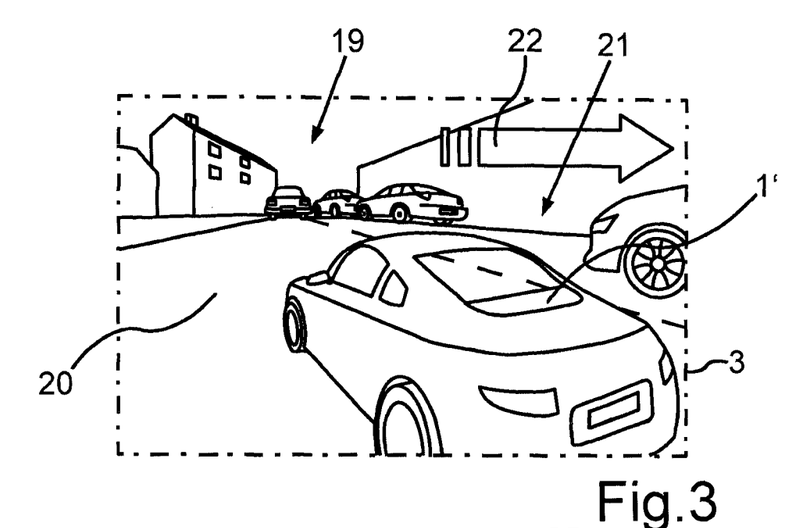
FIGS. 3 to 5 show a chronology of images which are produced from the image data, and displayed, during a survey on a parking space and during a parking operation for the motor vehicle.
Figure 4:
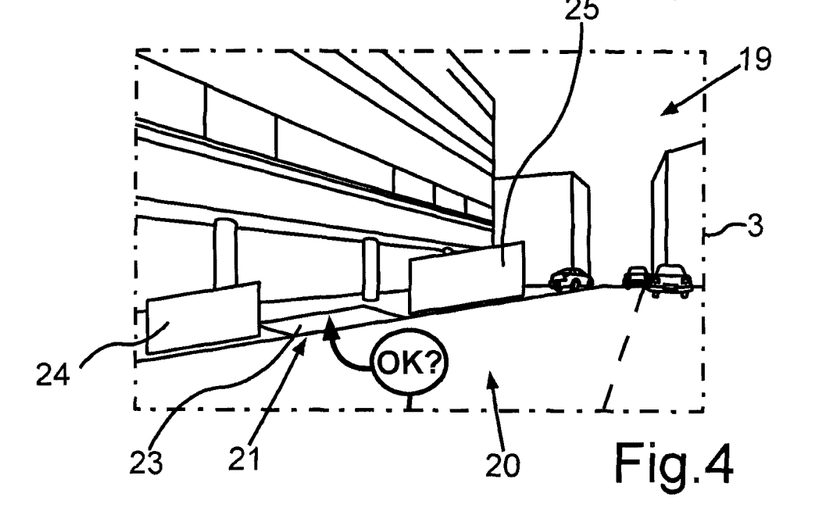
Figure 5:
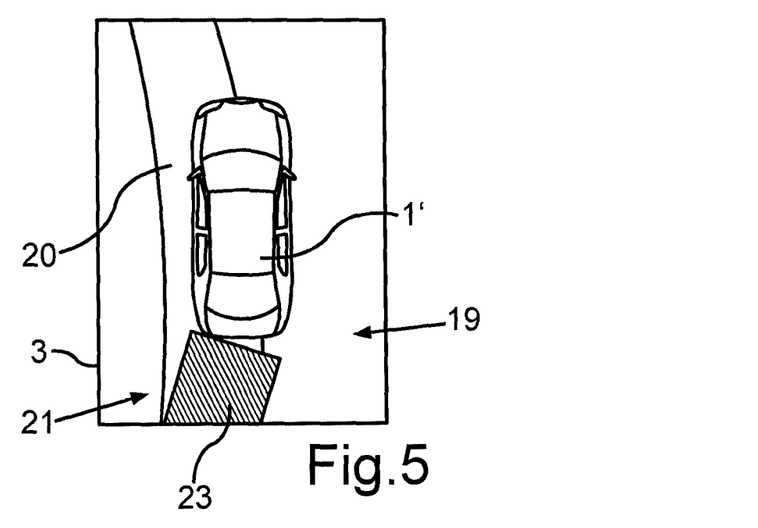

FIGS. 3 to 5 show an exemplary chronology of images 19, as are presented on the display device 3 during a parking operation. FIG. 3 shows the motor vehicle 1' and also a surrounding area 20 for the motor vehicle 1 from a perspective view. The motor vehicle 1' is passing a series of other motor vehicles. On the right-hand side of the motor vehicle 1', there is a parking space 21 which is surveyed by means of the distance sensor 18. The image 19 shown in FIG. 3 presents the motor vehicle 1' at a fixed location or statically, while the surrounding area 20 is progressively produced from the continuously captured image data afresh each time. Thus, the surrounding area 20 in the image 19 moves, namely including the series of other motor vehicles, as presented by means of an arrow presentation 22. The image 19 shown in FIG. 3 shows the motor vehicle 1' and also the surrounding area 20 from a field of view 15 which is behind the motor vehicle 1'. Furthermore, the direction of view 14 points essentially in the direction of travel of the motor vehicle 1. To be more precise, the direction of view 14 contains a direction component for the direction of travel and also a direction component for the right-hand transverse half-axis of the motor vehicle 1. In this way, it is possible to depict the parking space 21 situated in front of the motor vehicle 1.

When the motor vehicle 1 passes the parking space 21, this parking space 21 can be surveyed using the distance sensor 18. If this parking space 21 is suitable for parking, the driver is informed. In the image 19 shown in FIG. 4, the parking space 21 is already behind the motor vehicle 1. Since this parking space 21 is suitable for parking, the direction of view 14 is now constantly altered, and the parking space 21 is displayed in a perspective presentation. The image 19 is used to ask the driver whether or not the parking operation shall be initiated. In the image 19 shown in FIG. 4, the motor vehicle 1 is thus in an initial area of the calculated parking path. In this case, the direction of view 14 points in the direction of the parking path 21. The field of view 15 may be situated either behind the motor vehicle 1 or above the motor vehicle 1 or else in front of the motor vehicle 1.

The parking space 21 is highlighted by means of a symbol 23 in the image 19 shown in FIG. 4. The other motor vehicles which directly bound the parking space 21 also each have a symbol 24, 25 superimposed on or concealing them. Hence, these motor vehicles are also highlighted.

When the motor vehicle 1 enters a prescribed end area of the parking path or when a remaining distance for the parking path is below a prescribed minimum, the direction of view 14 and the field of view 15 are altered such that they coincide with the vehicle vertical axis z (FIG. 2). Such an image 19 for this direction of view 14 is presented in FIG. 5. The image 19 shown in FIG. 5 thus shows a plan view of the whole motor vehicle 1' and also the surrounding area 20 from a right angle in relation to the image plane. The driver can therefore use this image 19 to particularly easily infer the distances between the motor vehicle 1 and obstacles that are external to the vehicle. The image 19 shown in FIG. 5 also presents the motor vehicle 1' at a fixed location, while the surrounding area 20 is mapped from the progressively captured image data afresh each time.

A change from the image 19 shown in FIG. 3 via the image 19 shown in FIG. 4 to the image 19 shown in FIG. 5 is made constantly in the exemplary embodiment, namely such that the driver does not perceive any abrupt changes in the image 19. The transition thus takes place smoothly. This means that the direction of view 14 and the field of view 15 are altered constantly. Provision may also be made for the direction of view 14 and/or the field of view 15 to be altered continuously over time for at least one section of the parking path. By way of example, the speed of this alteration can be set on the basis of the respective current speed of the motor vehicle 1 and/or on the basis of the remaining distance for the parking path or the distance between the motor vehicle 1 and a final position in the parking space 21.

The invention claimed is:

1. A method for assisting in a parking operation for a motor vehicle using a driver assistance system, comprising:
 obtaining a point of interest based on a current setting of the motor vehicle by actively surveying all surrounding areas next to the motor vehicle and identifying the point of interest based on a current position of the motor vehicle relative to the point of interest;
 determining a parking path along which the motor vehicle is parked into a parking space or driven out of the parking space, the parking path being determined based on a distance from the motor vehicle to the point of interest;

capturing image data about surroundings of the motor vehicle using at least one optical capture device of the driver assistance system;

processing the image data to produce an image which shows a perspective view of at least one surrounding area of all the surrounding areas next to the motor vehicle, wherein the image is produced based on the current position of the motor vehicle on the parking path and the distance from the motor vehicle to the point of interest;

instantaneously determining the perspective view based on the current position of the motor vehicle on the parking path and the distance from the motor vehicle to the point of interest;

determining a direction of view based on the current position of the motor vehicle;

determining a field of view based on a current speed of the motor vehicle;

setting the direction of view and the field of view; and displaying the image on a display device, wherein:

the image comprises the motor vehicle at a fixed location, or statically, while the at least one surrounding area moves, and the perspective view changes, to focus on the point of interest, the motor vehicle at the fixed location being displayed showing all perspective boundaries from an obliquely downward view in which the point of interest and the at least one surrounding area are located behind the motor vehicle, the display device displays the perspective view centred in the point of interest even when the point of interest is:

behind the motor vehicle, and/or contrary to a direction of motion of the motor vehicle, the direction of view and the field of view of the perspective view are continuously altered over time in response to a remaining distance of the motor vehicle on the parking path being below a prescribed minimum, in response to the remaining distance of the motor vehicle on the parking path being below the prescribed minimum, the perspective view is shown from a different direction of view directly above a vehicle vertical axis, and the perspective view includes the image of at least one portion of the motor vehicle and corresponding immediate surroundings of the at least one portion of the motor vehicle.

2. The method according to claim 1, wherein the image data are processed such that the image shows a plan view of at least the surrounding area next to the motor vehicle from above the motor vehicle.

3. The method according to claim 1, wherein for at least one section of the parking path the image also shows at least one area of the motor vehicle in addition to the surrounding area.

4. The method according to claim 3, wherein the map of the motor vehicle is presented at the fixed location in the displayed image, while the map of the surrounding area is produced from the image data afresh each time.

5. The method according to claim 1, wherein during an operation of capturing the parking space, while the motor vehicle is passing the parking space, the perspective view comprises a different direction of view comprising:

a first direction component independent from a direction of travel of the motor vehicle and a second direction component for a transverse half-axis of the motor vehicle.

6. The method according to claim 1, wherein when the motor vehicle is in an initial area of the carriageway, the perspective view is shown from a direction of view that points in the direction of an end of the parking path.

7. The method according to claim 1, wherein while the motor vehicle is being moved along the parking path, a direction of view and a field of view from which the perspective view is shown are automatically altered continuously over time for at least a section of the parking path, on the basis of the current speed of the motor vehicle and on the basis of a remaining distance for the parking path.

8. The method according to claim 1, wherein:

the image data are captured by four optical capture devices, each of the four optical capture devices comprising a capture angle between 170 degrees to 195 degrees, inclusive, and the four optical devices capture an entirety of the immediate surroundings of the motor vehicle.

9. The method according to claim 1, wherein two optical capture devices capture a different perspective view that comprises an image of an area of the motor vehicle and corresponding immediate surroundings of the motor vehicle.

10. A motor vehicle having a driver assistance system according to claim 1.

11. The method according to claim 1, wherein:

a size of the mapped surrounding area is set on a basis of the current position of the motor vehicle on the parking path, and the size of the mapped surrounding area changes on a basis of the current speed of the motor vehicle.

12. A driver assistance system for a motor vehicle, for assisting in a parking operation, comprising:

at least one optical capture device for capturing image data about surroundings of the motor vehicle;

a control device for determining a parking path for the parking operation, for obtaining a point of interest based on a current setting of the motor vehicle, and for processing the image data; and a head-up display device for displaying an image based on the image data processed and based on a current position of the motor vehicle on the parking path, the image comprising:

a perspective view determined based on the current position of the motor vehicle on the parking path and the distance from the motor vehicle to the point of interest, a direction of view determined based on the current position of the motor vehicle, and a field of view determined based on a current speed of the motor vehicle, and the motor vehicle at a fixed location, or statically, while at least one surrounding area moves, and the perspective view changes, to focus on the point of interest, the motor vehicle at the fixed location being displayed showing all perspective boundaries from an obliquely downward view in which the point of interest and the at least one surrounding area are located behind the motor vehicle, wherein:

the point of interest is obtained by actively surveying all surrounding areas next to the motor vehicle and identifying the point of interest based on a current position of the motor vehicle relative to the point of interest, the parking path is determined based on a distance from the motor vehicle to the point of interest, the head-up display device displays the perspective view centred in the point of interest even when the point of interest is:

be­hind the motor vehicle, and/or contrary to the direction of motion of the motor vehicle, the direction of view and the field of view of the perspective view are continuously altered over time in response to a remaining distance of the motor vehicle on the parking path being below a prescribed minimum, and in response to the remaining distance of the motor vehicle on the parking path being below the prescribed minimum, the perspective view is shown from a direction of view directly above a vehicle vertical axis, and the perspective view includes the image of at least one portion of the motor vehicle and corresponding immediate surroundings of the at least one portion of the motor vehicle.

13. The system according to claim 12, wherein:

a size of the mapped surrounding area is set on a basis of the current position of the motor vehicle on the parking path, and the size of the mapped surrounding area changes on a basis of the current speed of the motor vehicle.

14. A driver assistance system for a motor vehicle, for assisting in a parking operation, comprising:

four optical capture devices for capturing image data about surroundings of the motor vehicle, each of the four optical capture devices comprising a capture angle between 170 degrees to 195 degrees, inclusive;

a control device for determining a parking path for the parking operation, for obtaining a point of interest based on a current setting of the motor vehicle, and for processing the image data to produce an image which shows a perspective view of at least one surrounding area next to the motor vehicle; and a display device for displaying an image based on the image data processed and based on a current position of the motor vehicle on the parking path, the image comprising:

a perspective view determined based on the current position of the motor vehicle on the parking path, and the motor vehicle at a fixed location, or statically, while at least one surrounding area moves, and the perspective view changes, to focus on the point of interest, the motor vehicle at the fixed location being displayed showing all perspective boundaries from an obliquely downward view in which the point of interest and the at least one surrounding area are located behind the motor vehicle, wherein:

the point of interest is obtained by actively surveying all surrounding areas next to the motor vehicle and identifying the point of interest based on a current position of the motor vehicle relative to the point of interest, the parking path is determined based on a distance from the motor vehicle to the point of interest, the four optical devices capture an entirety of the immediate surroundings of the motor vehicle, a first optical capture device is arranged on a front bumper of the motor vehicle, a second optical capture device is arranged on a rear bumper or a tailgate of the motor vehicle, a third optical capture device is mounted on a left-hand flank or integrated in a left-hand exterior mirror of the motor vehicle, and a fourth optical capture device is mounted on a right-hand flank in the area of a right-hand exterior mirror or integrated in the exterior mirror.

15. The system according to claim 14, wherein the image shows the motor vehicle and also the surrounding area from a field of view which is behind the motor vehicle contrary to a direction of motion.

16. The system according to claim 14, wherein the image shows the motor vehicle and also the surrounding area from a field of view which is in front of the motor vehicle and opposite to a direction of motion.

17. The system according to claim 14, wherein the image shows the motor vehicle and also the surrounding area from the field of view in the direction of travel when the motor vehicle is outside of the parking path.

18. The system according to claim 14, the image further comprising:

a direction of view determined based on the current position of the motor vehicle; and a field of view determined based on a current speed of the motor vehicle, wherein:

the display device displays the perspective view centred in the point of interest even when the point of interest is:

behind the motor vehicle, and/or contrary to the direction of motion of the motor vehicle, the direction of view and the field of view of the perspective view are continuously altered over time in response to a remaining distance of the motor vehicle on the parking path being below a prescribed minimum, in response to the remaining distance of the motor vehicle on the parking path being below the prescribed minimum, the perspective view is shown from a direction of view directly above a vehicle vertical axis, and the perspective view includes the image of an area of the motor vehicle and corresponding immediate surroundings of the motor vehicle.

19. The system according to claim 14, wherein the perspective view further comprises:

a highlighted parking space by means of a symbol superimposed in the image, and other vehicles near the parking space highlighted with a symbol concealing them in the image.

20. The system according to claim 14, wherein:

when the motor vehicle approaches a parking space, the parking space is automatically surveyed using a distance sensor, and if the parking space is suitable for parking, the driver is notified.

* * * * *